United States Patent
Okamoto et al.

(10) Patent No.: US 11,440,289 B2
(45) Date of Patent: Sep. 13, 2022

(54) MELT BLOWN NONWOVEN FABRIC, LAMINATE USING SAME, MELT BLOWN NONWOVEN FABRIC PRODUCTION METHOD AND MELT BLOWING APPARATUS

(71) Applicant: KURARAY CO., LTD., Kurashiki (JP)

(72) Inventors: Tetsuya Okamoto, Saijo (JP); Yasuhiro Shirotani, Saijo (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/784,537

(22) Filed: Feb. 7, 2020

(65) Prior Publication Data

US 2020/0171789 A1 Jun. 4, 2020

Related U.S. Application Data

(63) Continuation of application No. PCT/JP2018/028417, filed on Jul. 30, 2018.

(30) Foreign Application Priority Data

Aug. 10, 2017 (JP) .............................. JP2017-155193

(51) Int. Cl.
*B32B 5/26* (2006.01)
*B32B 5/02* (2006.01)
(Continued)

(52) U.S. Cl.
CPC .............. *B32B 5/26* (2013.01); *B32B 5/022* (2013.01); *B32B 37/04* (2013.01); *B32B 37/26* (2013.01);
(Continued)

(58) Field of Classification Search
CPC ........... B32B 5/26; B32B 5/022; B32B 37/04; B32B 37/26; B32B 2367/00;
(Continued)

(56) References Cited

U.S. PATENT DOCUMENTS 4,199,635 A * 4/1980 Parker ...................... B32B 5/06
442/388
6,667,254 B1 12/2003 Thompson, Jr. et al.
(Continued)

FOREIGN PATENT DOCUMENTS

CN 1222645 C 10/2005
CN 101622388 A 1/2010
(Continued)

OTHER PUBLICATIONS

English translation of the International Preliminary Report on Patentability and Written Opinion of the International Searching Authority dated Feb. 20, 2020 in PCT/JP2018/028417 filed Jul. 30, 2018, 6 pages.

(Continued)

*Primary Examiner* — Jeremy R Pierce
(74) *Attorney, Agent, or Firm* — Oblon, McClelland, Maier & Neustadt, L.L.P.

(57) ABSTRACT

Provided are a melt blown (MB) nonwoven fabric, a laminate using the same, a method of producing a melt blown nonwoven fabric as well as a melt blowing apparatus. A melt blowing apparatus 100 includes a die 10 configured to discharge a resin melt 42 with an accompanying jet to give fiber materials, a hollow cover 20, and a collector 60. The fiber materials 50 from the die 10 are heated to a temperature equal to or higher than a crystallization temperature of crystalline thermoplastic resin inside the hollow cover 20 and collected on a collecting surface 62 of the collector 60. The hollow cover 20 and the collector 60 are separated by a distance of 5 cm or longer between a lower edge 28 of the hollow cover 20 and the collecting surface 62 in a line extending downwardly from the nozzle holes 12 in a vertical direction.

16 Claims, 3 Drawing Sheets

(51) Int. Cl.
  *B32B 37/04* (2006.01)
  *B32B 37/26* (2006.01)
  *D01D 5/08* (2006.01)
  *D01D 5/092* (2006.01)
  *D01D 13/00* (2006.01)
  *D04H 3/011* (2012.01)
  *D04H 3/16* (2006.01)

(52) U.S. Cl.
  CPC .............. *D01D 5/08* (2013.01); *D01D 5/092* (2013.01); *D01D 13/00* (2013.01); *D04H 3/011* (2013.01); *D04H 3/16* (2013.01); *B32B 2305/18* (2013.01); *B32B 2307/102* (2013.01); *B32B 2307/704* (2013.01); *B32B 2307/724* (2013.01); *B32B 2367/00* (2013.01); *B32B 2605/00* (2013.01)

(58) Field of Classification Search
  CPC .......... B32B 2307/102; B32B 2305/18; B32B 2307/704; B32B 2307/724; D04H 1/435
  See application file for complete search history.

(56) References Cited

U.S. PATENT DOCUMENTS

| | | |
|---|---|---|
| 8,802,002 B2 | 8/2014 | Berrigan et al. |
| 2004/0113309 A1 | 6/2004 | Thompson, Jr. et al. |
| 2008/0160861 A1 | 7/2008 | Berrigan et al. |

FOREIGN PATENT DOCUMENTS

| | | | |
|---|---|---|---|
| CN | 101906678 A | 12/2010 | |
| CN | 104066880 A | 9/2014 | |
| CN | 104689366 A | 6/2015 | |
| JP | 3-45768 A | 2/1991 | |
| JP | 6-192954 A | 7/1994 | |
| JP | 11-131354 A | 5/1999 | |
| JP | 11-350324 A | 12/1999 | |
| JP | 2003-301357 A | 10/2003 | |
| JP | 2010-514953 A | 5/2010 | |
| JP | 2016-538439 A | 12/2016 | |
| WO | WO02/46504 A1 | 6/2002 | |
| WO | WO 2008/082872 A1 | 7/2008 | |

OTHER PUBLICATIONS

International Search Report dated Sep. 25, 2018 in PCT/JP2018/028417 filed Jul. 30, 2018, 2 pages.
Extended European Search Report dated Apr. 30, 2021 in European Patent Application No. 18844588.6, 9 pages.
Combined Taiwanese Office Action and Search Report dated Aug. 3, 2021 in Taiwanese Patent Application No. 107127226 (with unedited computer generated English transiation). 16 pages.
Office Action dated Nov. 30, 2021 in corresponding Indonesian Patent Application No. P00202001136 (with English Translation), 12 pages.
Office Action dated Jan. 17, 2022 in corresponding European Patent Application No. 18 844 588.6, 4 pages.
Combined Chinese Office Action and Search Report dated Sep. 1, 2021 in corresponding Chinese Patent Application No. 2018800516670 (with English Translation and English Translation of Category of Cited Documents), 13 pages
Japanese Office Action dated Feb. 15, 2022 in Japanese Patent Application No. 2019-535112, 1 page.
Japanese Notification dated Feb. 9, 2022 in Japanese Patent Application No. 2019-535112 (with unedited computer generated English translation), 10 pages.
Notice of Reasons for Refusal dated Apr. 26, 2022, in corresponding Japanese Patent Application No. 2019-535112 with English Machine language Translation). (Cited references already filed).
Decision of Rejection dated May 11, 2022, in corresponding Taiwan Patent Application No. 11120468330 (with Machine English-language Translation).
Second Offie Action dated May 10, 2022, in corresponding Chinese Patent Application No. 201880051667.0 (with Machine English-language Translation).
Decision of Rejection dated May 11, 2022, in corresponding Taiwan Patent Application No. 187127226 (with Machine English-language Translation).
Second Office Action dated May 10, 2022, in corresponding Chinese Patent Application No. 201880051667.0 (with Machine English-language Translation).

\* cited by examiner

MELT BLOWN NONWOVEN FABRIC, LAMINATE USING SAME, MELT BLOWN NONWOVEN FABRIC PRODUCTION METHOD AND MELT BLOWING APPARATUS

CROSS REFERENCE TO THE RELATED APPLICATION

This application is a continuation application, under 35 U.S.C § 111(a) of international application No. PCT/JP2018/028417, filed Jul. 30, 2018, which claims priority to Japanese patent application No. 2017-155193, filed Aug. 10, 2017, the entire disclosures of which are herein incorporated by reference as a part of this application.

BACKGROUND OF THE INVENTION

Field of the Invention

The present invention relates to a melt blown nonwoven fabric having improved thermostability and soft texture, to a laminate using the same, to a method of producing a melt blown nonwoven fabric as well as to a melt blowing apparatus.

Description of Related Art

Although polyethylene terephthalate (PET) resin has been utilized in various forms as nonwoven fabrics because of their high versatility, their application is little expanded to be used as melt blown (MB) nonwoven fabrics. One of the reasons is that PET has a lower crystallization speed than those of other crystalline polymers that are frequently used for melt blown nonwoven fabrics. In other word, since polyethylene terephthalate (PET) resin cannot achieve a sufficiently high degree of crystallization in melt blowing process because of their lower crystallization speed, resulting in low thermostability of the obtained melt blown (MB) nonwoven fabrics. Such MB nonwoven fabrics having low thermostability, for example, would considerably shrink when the MB nonwoven fabrics are situated at a temperature of 200° C., which is higher than a glass transition point (approximately 130° C.) of PET by 70 to 80° C., under no tension.

For example, Patent Document 1 (JP Laid-open Patent Publication No. H03-045768) describes a method of producing an MB nonwoven fabric, the method including subjecting a web that is melt blown from a PET resin to a dry heat treatment at a temperature of 180° C. or lower so as to make the PET resin crystallized to have a degree of crystallization of not to exceed 30%. Patent Document 1 describes that the obtained MB nonwoven fabric has a surface shrinkage ratio under heated water of 20% or less.

RELATED DOCUMENT

Patent Document

[Patent Document 1] JP Laid-open Patent Publication No. H03-045768

SUMMARY OF THE INVENTION

However, Patent Document 1 requires the web to be subjected to an additional heat treatment process, so that the resultant nonwoven fabric has hard texture due to heating of the web itself. Moreover, thermostability at high temperature, such as 100° C. or higher (for example, at 200° C.) of the MB nonwoven fabric is not described. Further, the MB nonwoven fabric produced by such a production process inevitably has a lower strength than those of typical MB nonwoven fabrics made of easily-crystallized polymers.

Therefore, an object of the present invention is to provide a PET-series MB nonwoven fabric having a low surface shrinkage ratio at 200° C. and having soft texture, as well as a laminate using the same.

Another object of the present invention is to provide a melt blowing method (or a method of producing a MB nonwoven fabric) and a melt blowing apparatus both of which are capable of imparting soft texture to a thermoplastic resin MB nonwoven fabric and improving thermostability of the fabric.

The inventors of the present invention have made extensive efforts to achieve the objects and first found that (i) since there is no drawing step after spinning in melt blowing process, there is a possibility that the melt blown fabric under heated condition, where heating makes it easy for the molecules to move, may cause excessive heat shrinkage due to "propensity for taking coil shapes" inherent to PET molecules. With the progress in the study, the inventors found that (ii) heat shrinkage at a temperature as high as 200° C. can be suppressed even for PET-series MB nonwoven fabrics by providing a heating zone, following melt blowing spinning, so as to promote crystallization of PET molecules and to provide pseudo-drawing effects by accompanying jet. Further, the inventors of the present invention identified a new problem that in such a case, soft texture of MB nonwoven fabrics is deteriorated. The inventors continued the study to solve the new problem and finally have found that (iii) by providing an air gap zone having a predetermined range where fiber materials travel with accompanying jet following the heating zone, MB nonwoven fabrics having not only thermostability but also soft texture can be successfully obtained. The inventors thus achieved the present invention.

That is, the present invention may include the following aspects.

Aspect 1

A melt blown nonwoven fabric comprising a resin composition including a polyethylene terephthalate-series resin as a principal component, wherein the melt blown nonwoven fabric has a surface shrinkage ratio at 200° C. of 20% or lower and a longitudinal 10% modulus at 30° C. of 22 N/5 cm or lower.

Aspect 2

The melt blown nonwoven fabric according to aspect 1, wherein the melt blown nonwoven fabric has a longitudinal tensile strength ($T_{MD}$) of 10 N/5 cm or higher and a ratio ($T_{MD}/T_{CD}$) of the longitudinal tensile strength ($T_{MD}$) to a transverse tensile strength ($T_{CD}$) in a range from 1.00 to 1.40.

Aspect 3

The melt blown nonwoven fabric according to aspect 1 or 2, wherein the melt blown nonwoven fabric has a longitudinal elongation ratio ($E_{MD}$) of 25% or higher and a ratio ($E_{MD}/E_{CD}$) of the longitudinal elongation ratio ($E_{MD}$) to a transverse elongation ratio ($E_{CD}$) in a range from 0.80 to 1.20.

Aspect 4

The melt blown nonwoven fabric according to any one of aspects 1 to 3, wherein the melt blown nonwoven fabric has an air permeability of from 30 to 90 $cm^3/cm^2 \cdot s$ in accordance with JIS L 1906.

Aspect 5

The melt blown nonwoven fabric according to any one of aspects 1 to 4, wherein the melt blown nonwoven fabric is used for an acoustic material for a vehicle.

Aspect 6

A laminate comprising a support and a melt blown nonwoven fabric that is thermocompression-bonded to at least one surface of the support, wherein the melt blown nonwoven fabric is a melt blown nonwoven fabric recited in any one of aspects 1 to 5.

Aspect 7

The laminate according to aspect 6, wherein the laminate has a peeling strength (T-peel) of 0.2 N/5 cm or higher in accordance with JIS K 6854-3 at a thermocompression-bonded surface between the melt blown nonwoven fabric and the support.

Aspect 8

The laminate according to aspect 6 or 7, wherein the support is formed of a nonwoven fabric or a felt.

Aspect 9

An acoustic material for a vehicle, comprising a laminate recited in any one of aspects 6 to 8.

Aspect 10

A method of producing a melt blown nonwoven fabric, the method comprising:
- heating a resin composition including a crystalline thermoplastic resin to give a melt and discharging the melt with accompanying jet (air stream that accompanies the discharged melt) through nozzle holes to give fiber materials;
- heating the fiber materials discharged through the nozzle holes in a heating zone;
- exposing the heated fiber materials to outside air in an air gap zone to cool the fiber materials; and
- collecting the cooled fiber materials on a collecting surface to obtain a web,
- wherein at least a part of the heating zone is heated to a crystallization temperature of the crystalline thermoplastic resin or higher; and
- the air gap zone is a space between a lower edge of the heating zone and the collecting surface, the space having a distance L of 5 cm or longer in a line extending downwardly from the nozzle holes in a vertical direction.

Aspect 11

The method of producing a melt blown nonwoven fabric according to aspect 10, wherein the heating zone is a space between the nozzle holes and the lower edge of the heating zone, the space having a distance H of 10 cm or longer in the line extending downwardly from the nozzle holes in the vertical direction.

Aspect 12

The method of producing a melt blown nonwoven fabric according to aspect 10 or 11, wherein the fiber materials have a temperature equal to or higher than the crystallization temperature (Tc)—25° C., at a position 10 cm below the nozzle holes in the vertical direction in the heating zone.

Aspect 13

The method of producing a melt blown nonwoven fabric recited in any one of aspects 10 to 12, wherein the crystalline thermoplastic resin is a polyethylene terephthalate-series resin.

Aspect 14

A melt blowing apparatus at least comprising:
- an extruder configured to heat a resin composition including a crystalline thermoplastic resin to give a melt;
- a die configured to discharge the melt with an accompanying jet to give fiber materials;
- a hollow cover provided in a downstream side of the accompanying jet and configured to surround the fiber materials;
- a heating unit configured to heat the fiber materials to a predetermined temperature (for example, to a temperature equal to or higher than a crystallization temperature of the crystalline thermoplastic resin);
- a collector having a collecting surface configured to collect the fiber materials flowing from the hollow cover in a downward direction of the accompanying jet,
- wherein the hollow cover and the collector are separated by a distance of 5 cm or longer between a lower edge of the hollow cover and the collecting surface in a line extending downwardly from the nozzle holes in a vertical direction.

Aspect 15

The melt blowing apparatus according to aspect 14, wherein the nozzle holes and the lower edge of the hollow cover are separated by a distance of 10 cm or longer in the line extending downwardly from the nozzle holes in the vertical direction.

Aspect 16

The melt blowing apparatus according to aspect 14 or 15, wherein the hollow cover is formed with an air blowing port configured to introduce heated air.

EFFECT OF THE INVENTION

According to an MB nonwoven fabric of the present invention, a PET-series MB nonwoven fabric having soft texture and excellent thermostability at high temperature of 200° C. as well as a laminate using the same can be obtained.

Further, the present invention can provide a melt blowing method and a melt blowing apparatus capable of imparting soft texture to an MB nonwoven fabric and improving thermostability of the fabric, even where a crystalline thermoplastic resin (in particular, resins having low crystallization speeds) is used, thanks to the specific heating zone and air gap zone following spinning zone.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the figures.

DESCRIPTION OF THE EMBODIMENTS

Hereinafter, the embodiments of the present invention will be explained with reference to the drawings. It should be noted that the present invention is not limited to the illustrated embodiments.

Melt Blowing Method and Melt Blowing Apparatus

Figure 1:
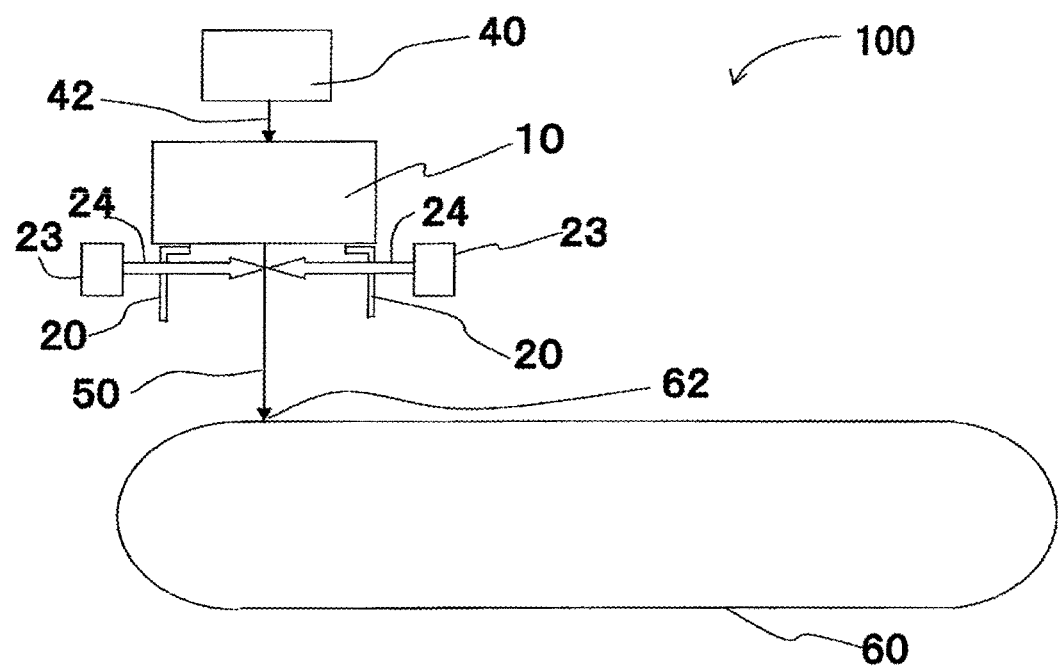
FIG. 1 is a schematic sectional view of a melt blowing apparatus according to an embodiment of the present invention.
Figure 2:
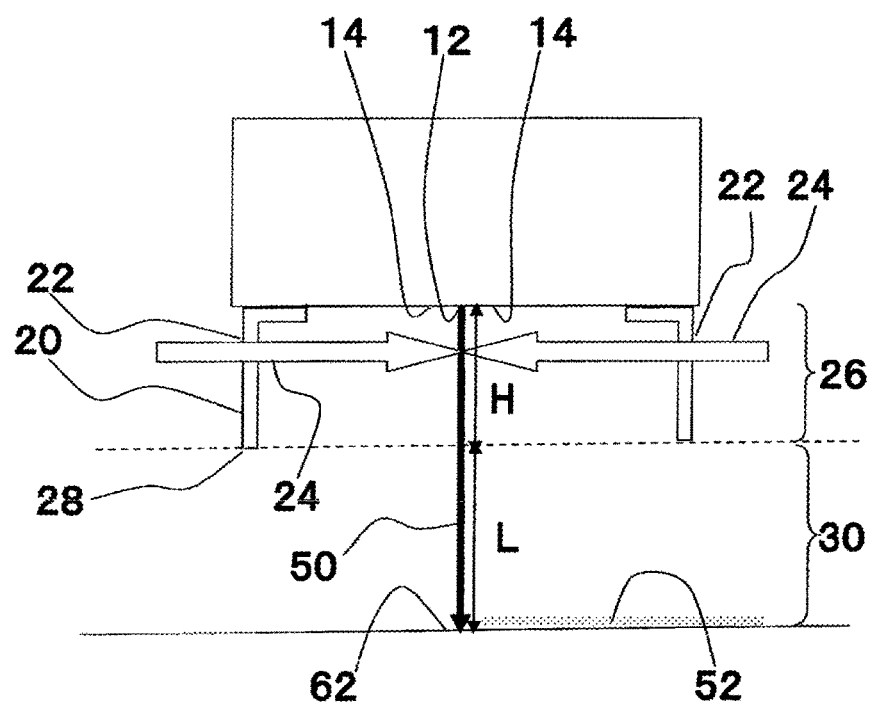
FIG. 2 is an enlarged schematic sectional view illustrating a component between a die 10 and a collecting surface 62 of a collector 60 of the melt blowing apparatus shown in FIG. 1.

FIG. 1 is a schematic sectional view of a melt blowing apparatus according to an embodiment of the present invention, and FIG. 2 is an enlarged schematic sectional view illustrating a component between a die 10 and a collecting surface 62 of a collector 60 of the melt blowing apparatus shown in FIG. 1. As shown in FIG. 1, in a melt blowing apparatus 100, a resin composition at least including a crystalline thermoplastic resin (such as, for example, polyethylene terephthalate) is heated in an extruder 40 to give a resin melt, and the resin melt 42 is directed to a die 10 discharging fiber materials. Next, the fiber materials 50 discharged from the die 10 travel toward a collecting surface 62 of a collector 60.

As shown in FIG. 2, the die 10 has nozzle holes 12 that discharge the resin melt 42 and is provided with hot-air injection channels (hot-air emerging slots) 14, 14 on both sides of the nozzle holes 12. Following the discharging, the fiber materials (or fibrous materials from molten resin) 50 discharged from the nozzle holes 12 with accompanying jet injected from the hot-air injection channels 14, 14 are first heated in a heating zone 26. The heating zone 26 is surrounded by a hollow cover 20 provided in a downstream side of the accompanying jet and is heated by a heating unit 23, such as a hot-air injector. This configuration makes it possible to heat at least a part of the heating zone 26 (for example, at a position 5 cm below the nozzle holes) to have a temperature equal to or higher than a crystallization temperature (Tc) of the thermoplastic resin. In view of effective heating, the heating unit 23 is preferably configured to heat the fiber materials 50 from side surfaces of the hollow cover 20. It should be noted that the crystallization temperature is measured in accordance with JIS K 7121.

The hollow cover 20 is provided below the nozzle holes 12 of the die 10 in the downstream side of the accompanying jet, if necessary, via a spacer part (not illustrated). Each of the upper and lower edges of the hollow cover 20 independently may be open or may have opening(s) so that the fiber materials 50 can pass through.

Since the temperature of the fiber materials 50 discharged from the nozzle holes 12 generally decreases soon after discharge, it is difficult to promote crystallization of a thermoplastic resin, where the resin has a low crystallization speed. It comes to possible, however, by a heated space that has a temperature equal to or higher than the crystallization temperature (Tc) of the thermoplastic resin, in the heating zone 26, to promote crystallization of the fiber materials 50, even where the thermoplastic resin has a low crystallization speed.

Thus, thermostability of the MB nonwoven fabric can be enhanced presumably because crystallization can be promoted at a stage of the fiber materials 50 while pseudo-drawing force by the accompanying jet is applied. As a result, for example, even if the fabric is exposed to high temperature, extensive shrinkage of the nonwoven fabric can be prevented.

Although a heated part of the heating zone 26 is not particularly limited as long as a degree of crystallization of the fiber materials 50 can be enhanced in the heating zone 26, the heated part is preferably located, for example, near the nozzle holes 12. The location near the nozzle holes may be, for example, in a semispherical space having a radius of 5 cm from a center at each nozzle hole.

A length of the heating zone in an up-and-down direction can be expressed as a distance H from the upper edge to the lower edge of the heating zone 26 in a line extending downwardly in a vertical direction from the nozzle holes 12 on the die 10. The distance H typically corresponds to a distance from the nozzle holes 12 to the lower edge 28 of the hollow cover 20 in the line extending downward from the nozzle holes in the vertical direction. It should be noted that where the lower edge of the hollow cover 20 has uneven shape in the up-and-down direction, the lower edge of the hollow cover 20 may be a highest (uppermost) point of the lower edge of the hollow cover 20 in a horizontal projection drawing, i.e., an elevation drawing, of the hollow cover part 20.

The distance H may be set in accordance with the temperature of the heating zone 26 and may be, for example, 10 cm or longer, preferably 10.5 cm or longer, and more preferably 11 cm or longer. Although the distance H does not particularly have an upper limit as far as it does not deteriorate the effects of the present invention, it may be about 18 cm in order to enhance elongation of the MB nonwoven fabric.

Without the heating zone, the fiber materials exposed to outside air are rapidly cooled after discharge. The present invention, however, makes it possible to suppress rapid cooling of the fiber materials after discharge thanks to the heating zone that is adjusted to a certain temperature. For example, the fiber materials taken at a position 10 cm below the nozzle holes 12 in the vertical direction may have, for example, a temperature of (Tc−25) ° C. or higher and preferably (Tc−20) ° C. or higher. An upper limit may be suitably selected in a range that allows crystallization of the fiber materials 50 to be promoted and may be, for example, (Tc+10) ° C. or lower and preferably Tc ° C. or lower in terms of economic efficiency.

For example, in the case of a polyethylene terephthalate resin composition, the fiber materials taken at a position 10 cm below the nozzle holes 12 in the vertical direction may have, for example, a temperature of 105° C. or higher and preferably 110° C. or higher.

A heating unit (heat source) 23 for heating the heating zone 26 is not particularly limited as long as it can heat an inside of the hollow cover 20, examples may include a heater or a hot-air injector. In terms of heat efficiency, a hot-air injector is preferable. For example, as shown in FIG. 2, the hollow cover 20 is formed with air blowing ports 22, 22 for introducing heated air flow 24 from a hot-air injector 23. In this case, the heated air flow 24, 24 is injected to front and back surfaces of the fiber materials 50 through the air blowing ports 22, 22. The heated air flow 24, 24 may be injected to the entire fiber materials 50 or to a part of the fiber materials 50 (for example, a part near the nozzle holes). A shape of the air blowing ports is not particularly limited as far as the ports allow heated air to be introduced to the inside of the hollow cover 20. There may be one or more windows having a round shape or a polygonal shape provided on the hollow cover. For example, in order to uniformly heat the fiber materials in a widthwise direction thereof, the air blowing ports 22, 22 may have a width approximately equal to that of the fiber materials (for example, a width corresponding to an arranged width of a plurality of the nozzle holes 12 formed on the die 10).

A temperature of the heated air flow 24 injected from the air blowing ports 22, 22 is not particularly limited as long as the heating zone can be heated to a predetermined temperature, and may be selected from a wide range of, for example, from about (Tc+30)° C. to about (Tc+250)° C. and preferably from about (Tc+40)° C. to about (Tc+240)° C. The nozzle may preferably inject air at an amount per meter of its width within a range where travelling of the fiber materials is not disturbed, e.g., from about 0.5 to about 5 Nm³/min and preferably from about 1 to about 3 Nm³/min.

The fiber materials 50 having passed through the heating zone 26 are exposed to outside air in an air gap zone 30 and are cooled thereby. In the air gap zone 30, the fiber materials 50 travel with the accompanying jet toward a collector 60 and pass through the air gap zone 30 having a predetermined range to be collected on a collecting surface 62.

A length of the air gap zone 30 in the up-and-down direction can be expressed as a distance L from the lower edge 28 of the heating zone 26 (or the lower edge 28 of the hollow cover 20) to the collecting surface 62 of the collector 60 in the line extending downward in the vertical direction from the nozzle holes 12 on the die 10. The distance L typically corresponds to a height from the lower edge 28 of the hollow cover 20 to the collecting surface 62. It should be noted that where the lower edge 28 of the hollow cover 20 and the collecting surface 62 of the collector 60 have uneven shapes in the up-and-down direction, the distance L may be a length from a vertically highest (uppermost) point of the lower edge of the hollow cover part 20 to a vertically highest (uppermost) point of the collecting surface 62 of the collector 60 in a horizontal projection figure, i.e., an elevation figure, of the hollow cover part 20 and the collector 60.

The distance L is required to be 5 cm or longer in order to impart soft texture to the fiber materials 50 having passed through the heating zone 26 with the accompanying jet. The fiber materials 50 that have been pseudo-drawn in the heating zone and have an enhanced crystallization then travel through the air gap zone 30 with the accompanying jet so that the fiber materials can reach a bulky web state while maintaining a crystallized state. As a result, it is possible to provide an MB nonwoven fabric with soft texture. The distance L may preferably be 6 cm or longer and more preferably 8 cm or longer. Although the distance L does not particularly have an upper limit, it may be about 15 cm in order to enhance collection efficiency.

A sum (H+L) of the distance H of the heating zone and the distance L of the air gap zone may be, for example, from about 13 to about 30 cm, preferably from about 15 to about 28 cm, and more preferably from about 18 to about 25 cm. Also, the distance H of the heating zone and the distance L of the air gap zone may have a ratio of, for example, 1<H/L<3.5, may have a ratio of 1<H/L<2, and preferably 1<H/L<1.5.

With respect to the accompanying jet injected from the hot-air injection channels 14, 14, for example, the hot air at the time of injection can have any temperature that is suitably set in accordance with a melting temperature of a resin composition used and may, for example, have a temperature substantially the same as a discharge temperature of the resin composition. The hot air can have any injection rate that is suitably set in a range that allows the hot air to provide pseudo-drawing effects to the fiber materials 50 in the heating zone as well as to loosen (split) the fiber materials 50 in the air gap zone 30. Such an injection rate may be, for example, from about 5 to about 30 Nm³/min, and preferably from about 10 to about 25 Nm³/min as an air amount per meter of the nozzle width.

The collector 60 is not particularly limited as far as the collector is a typically used one for producing MB nonwoven fabrics, and the collector may be a rotary roll or a conveyor belt. For example, the collector 60 may be a conveyor belt to be rotated in one direction as shown in FIG. 1, on the collecting surface 62 of which the fiber materials 50 are collected such that the MB nonwoven fabric 52 is continuously produced as the conveyor belt rotates.

Melt Blown Nonwoven Fabric

In the melt blowing method described above, since the fiber materials discharged from the nozzle together with the accompanying jet is subjected to the specific processes, it is possible to produce an MB nonwoven fabric from a crystalline thermoplastic resin, the fabric having good thermostability at high temperature as well as having soft texture.

For example, the MB nonwoven fabric may be made of a resin composition containing a crystalline thermoplastic resin as a principal component, and may have, for example, a surface shrinkage ratio at (Tm×¾) ° C. of 20% or lower (preferably 17% or lower, more preferably 16% or lower), where Tm denotes the melting point of the crystalline thermoplastic resin, and a longitudinal 10% modulus ($M_{MD}$) at 30° C. of 22 N/5 cm or lower in the longitudinal direction (MD direction). Examples of the crystalline thermoplastic resin may include polyolefin-series, polyamide-series, and polyester-series thermoplastic resins. The resin composition preferably contains the crystalline thermoplastic resin in a proportion of 50 wt % or more, more preferably 80 wt % or more, further preferably 90 wt % or more, and particularly preferably 98 wt % or more.

The resin composition may include an additive(s), for example, a delustering agent, such as titanium oxide, barium sulfate, and zinc sulfide; a heat stabilizer, such as phosphoric acid and phosphorous acid; a light stabilizer; an antioxidant; and/or a surface treatment agent, such as silicon oxide. These additives may be added in advance to a polymerization system in the polymerization process of the crystalline thermoplastic resin, or added when the crystalline thermoplastic resin is heated to give a melt after polymerization.

In particular, according to the melt blowing method, even where a polyethylene terephthalate-series (PET) resin having a low crystallization speed is used, it is possible to produce the PET-series MB nonwoven fabric having soft texture as well as good thermostability at high temperature due to effective suppression of heat shrinkage.

For example, such a PET-series MB nonwoven fabric may be made of a resin composition containing a PET-series resin as a principal component. The expression "containing a PET-series resin as a principal component" used herein means that the resin composition contains a PET-series resin in a proportion of 50 wt % or more, preferably 80 wt % or more, more preferably 90 wt % or more, and particularly preferably 98 wt % or more of resin components constituting the composition. It should be noted that the term "MB nonwoven fabric" refers to MB nonwoven fabrics that are not limited to those of PET-series, and that the term "PET-series MB nonwoven fabric" may be used when reference is made particularly to an MB nonwoven fabric specifically made of a PET-series resin.

It should be noted that the PET-series resin may be composed of a unit derived from ethylene glycol and a unit derived from terephthalic acid and may also contain less than 2.0 mol % of a copolymerization component according to intended uses.

The MB nonwoven fabric (in particular, PET-series MB nonwoven fabric) according to the present invention makes it possible to enhance thermostability at around 200° C., which has conventionally been impossible for PET-series MB nonwoven fabrics, and to achieve a surface shrinkage ratio of 20% or lower at 200° C. The surface shrinkage ratio may be preferably 17% or lower, and more preferably 16% or lower. It should be noted that the surface shrinkage ratio is measured in accordance with a method described for Examples described later. Such reduction in the surface shrinkage ratio at high temperature makes it possible to process the fabric at a higher temperature, so that the higher temperature can, e.g., shorten time for molding processing.

The MB nonwoven fabric according to the present invention makes it possible not only to enhance thermostability, but also to achieve soft texture, and may have a longitudinal 10% modulus ($M_{MD}$) at 30° C. of 22 N/5 cm or lower in the longitudinal direction (MD direction). The longitudinal 10% modulus ($M_{MD}$) at 30° C. may preferably be 21 N/5 cm or lower in the longitudinal direction (or MD direction). Also, a transverse 10% modulus ($M_{CD}$) at 30° C. may preferably be 18 N/5 cm or lower and more preferably 16 N/5 cm or lower in a transverse direction (or CD direction). The 10% modulus used herein means tensile stress at 10% stain and is, specifically, measured in accordance with a method described for Examples described later. In order to maintain soft texture, the MB nonwoven fabric preferably has approximately the same 10% moduli in the longitudinal direction (or MD direction) and in the transverse direction (or CD direction), and a ratio ($M_{MD}/M_{CD}$) of the 10% modulus ($M_{MD}$) in the longitudinal direction to the 10% modulus ($M_{CD}$) in the transverse direction may be, for example, in a range from about 1.00 to about 1.50, from about 1.05 to about 1.45, or from about 1.10 to about 1.40.

The MB nonwoven fabric according to the present invention may have strength and elongation that do not practically cause problem in handling, and may have, for example, a longitudinal tensile strength of 10 N/5 cm or higher, preferably 14 N/5 cm or higher, and more preferably 18 N/5 cm or higher in the longitudinal direction (stream direction or MD direction). The tensile strength is measured in accordance with a method described for Examples described later.

The MB nonwoven fabric according to the present invention may have approximately the same tensile strengths in the longitudinal direction (or MD direction) and in the transverse direction (or CD direction), and a ratio ($T_{MD}/T_{CD}$) of the tensile strength ($T_{MD}$) in the longitudinal direction to the tensile strength ($T_{CD}$) in the transverse direction may be, for example, in a range from about 1.00 to about 1.40, from about 1.00 to about 1.20, from about 1.10 to about 1.35, or from about 1.10 to about 1.20.

The MB nonwoven fabric according to the present invention may have, for example, a longitudinal elongation ratio of 25% or higher and preferably 30% or higher in the longitudinal direction (or MD direction). The elongation ratio is measured in accordance with a method described for Examples described later.

The MB nonwoven fabric according to the present invention may also have substantially the same elongation ratios in the longitudinal direction (MD direction) and in the transverse direction (CD direction), and a ratio ($E_{MD}/E_{CD}$) of the elongation ratio ($E_{MD}$) in the longitudinal direction to the elongation ratio ($E_{CD}$) in the transverse direction may be, for example, in a range from about 0.80 to about 1.20, from about 0.80 to about 1.15, from about 0.90 to about 1.20, or from about 0.95 to about 1.15.

The MB nonwoven fabric according to the present invention may have any average fiber diameter that is suitably set according to intended uses. Although the average fiber diameter is not particularly limited to a specific range, the average fiber diameter may be, for example, in a range from about 0.5 to about 10 μm, preferably from about 1 to about 8 μm, more preferably from about 1 to about 5 μm in terms of, for example, acoustic properties and strength of the nonwoven fabric. The average fiber diameter is measured in accordance with a method described for Examples described later.

The MB nonwoven fabric according to the present invention may have any density that is suitably set according to intended uses. Although the density is not particularly limited to a specific range, the density may be, for example, in a range from about 0.1 to about 0.4 g/cm$^3$, preferably from about 0.1 to about 0.3 g/cm$^3$, and more preferably from about 0.1 to about 0.2 g/cm$^3$ in terms of, for example, acoustic properties.

The MB nonwoven fabric according to the present invention may have any thickness that is suitably set according to intended uses. Although the thickness is not particularly limited to a specific range, the thickness may be, for example, in a range from about 50 to about 500 μm, preferably from about 80 to about 400 μm, and more preferably from about 100 to about 300 μm in terms of, for example, handling properties and acoustic properties.

The MB nonwoven fabric according to the present invention may have any basis weight that is suitably set according to intended uses. Although the basis weight is not particularly limited to a specific range, the basis weight may be, for example, in a range from about 10 to about 100 g/m$^2$, preferably from about 20 to about 70 g/m$^2$, and more preferably from about 20 to about 50 g/m$^2$ in terms of, for example, acoustic properties and productivity.

The MB nonwoven fabric according to the present invention may have any air permeability that is suitably set according to intended uses. Although the air permeability is not particularly limited to a specific range, the air permeability may be, for example, in a range from about 30 to about 90 cm$^3$/cm$^2$·s, preferably from about 35 to about 85 cm$^3$/cm$^2$·s, and more preferably from about 40 to about 80 cm$^3$/cm$^2$·s in terms of, for example, acoustic properties.

The MB nonwoven fabric according to the present invention can be applied to various applications, such as medical and hygienic materials, industrial materials, daily commodities and clothing. In particular, the MB nonwoven fabric can suitably be applied to, e.g., acoustic materials for vehicles (in particular, acoustic materials for automobiles), high-frequency acoustic panels for outdoor use, and noise suppression sheets for electronic devices because the MB nonwoven fabric is excellent in high-frequency acoustic properties.

The MB nonwoven fabric according to the present invention may be combined with various supports (for example, sheet-like resin members, fabrics) to be used as a laminate thanks to its excellent thermostability. The laminate may include, for example, a support and an MB nonwoven fabric that is thermocompression-bonded to at least one surface of the support, wherein the MB nonwoven fabric is a nonwoven fabric according to the present invention.

The MB nonwoven fabric according to the present invention has soft texture and good adhesion to a support, and may have, for example, a peeling strength (T-peel test) of 0.2 N/5 cm or higher, preferably 0.25 N/5 cm or higher, and more preferably 0.3 N/5 cm or higher in a thermocompression-bonding surface between the nonwoven fabric and the support, the peeling strength being measured in accordance with JIS K 6854-3.

The support may suitably be selected from various materials, including various resin sheets and fabrics (woven fabrics, knitted fabrics, nonwoven fabrics, felts), according to intended uses. The fabrics may be composed of any of natural fibers, regenerated fibers, semisynthetic fibers, and synthetic fibers. The nonwoven fabrics may be, for example, any of wet-laid nonwoven fabrics, dry-laid nonwoven fabrics (for example, chemically-bonded, thermally-bonded, needle-punched, spunlace, stitch-bonded, or air-laid nonwoven fabrics), and direct-spun nonwoven fabrics (for example, spun-bonded nonwoven fabrics). In order to adjust density and thickness and to enhance acoustic properties, the support may preferably be a felt or a nonwoven fabric (for example, a needle-punched nonwoven fabric).

The laminate can be used for the various applications mentioned above for the MB nonwoven fabric. In particular, the laminate can suitably be used as acoustic materials for vehicles (in particular, acoustic materials for automobiles), high-frequency acoustic panels for outdoor use, and noise suppression sheets for electronic devices because the laminate is excellent in high-frequency acoustic properties.

EXAMPLE

Hereinafter, the present invention will be further described in detail with reference to Examples below, which are not to be construed as limiting the scope of the present invention. In the Examples and Comparative Examples below, various physical properties were measured by the following methods.

Average Fiber Diameter of Fibers

An MB nonwoven fiber structure was observed using a scanning electron microscope (SEM). From an SEM image, 100 fibers were randomly selected and measured for fiber diameters to calculate a number average fiber diameter. The number average fiber diameter was used as an average fiber diameter of the fibers.

Basis Weight

In accordance with section 6.1 of JIS L 1913 "Testing methods for general nonwoven fabrics," a basis weight ($g/m^2$) of MB nonwoven fabric was measured.

Thickness

In accordance with section 6.2 of JIS L 1913 "Testing methods for general nonwoven fabrics," a thickness of MB nonwoven fabric was measured.

Density

From the basis weight and the thickness of the nonwoven fabric, the volume of the nonwoven fabric was obtained to determine from the calculation of a density of the MB nonwoven fabric from these measurements.

Air Permeability

In accordance with section 8.26 of JIS L 1096 "Testing methods for woven and knitted fabrics," an air permeability ($cm^3/cm^2 \cdot s$) was measured by Frazier Method.

Strength, Elongation and 10% Modulus

Each of the samples cut to a length of 5 cm×5 cm in the longitudinal and transverse directions was elongated at a tensile speed of 10 cm/min in accordance with JIS L 1906, using an Autograph manufactured by Shimadzu Corporation, to determine a load value and an elongation ratio at which breakage occurs as tensile strength and elongation of the sample, respectively. Tensile stress at an elongation of 10% was measured as a 10% modulus. These measurements were performed at 30° C.

Surface Shrinkage Ratio at 200° C.

A 20-cm square sample was prepared and marked with lines drawn at positions 5 cm inward from respective sides so as to mark a 10-cm square inside the sample. The sample was then placed in an oven heated to 200° C. and was subjected to heating for 1 minute under no tension. The marked area was measured for the dimensions before and after heating to calculate a surface shrinkage ratio by the following formula.

(Surface shrinkage ratio)={(Pre-heating surface area)−(Post-heating surface area)}/(Pre-heating surface area)×100

Molding Processability at 200° C.

A 20-cm square sample and a 20-cm square support (a felt having a basis weight of about 600 $g/m^2$) were overlaid on each other. Then, the sample and the support in an overlapped state were pressed between iron plates to be heated for 1 minute at a temperature of 200° C. under pressure of 200 Pa, and thus obtained laminate was taken out. The laminate was evaluated in terms of molding processability at 200° C., on a scale of A and B. "A" indicates that the laminate did not have specific defects in appearance, such as winkles, after heating, and the MB nonwoven fabric was not deteriorated in soft texture, and "B" indicates that the laminate had defects in appearance, such as winkles, after heating and/or the MB nonwoven fabric was deteriorated in soft texture.

Peeling Strength of Laminate

The laminate obtained for evaluating molding processability at 200° C. was subjected to peeling text to determine peeling strength between the sample and the support in accordance with T-peel test in JIS K 6854-3.

Example 1

A PET resin (having a crystallization temperature (Tc) of 130° C.) having a melt viscosity at 300° C. of 80 Pa·s was molten to give a resin melt, and the resin melt was supplied to a die having a nozzle with a nozzle hole diameter (diameter) of 0.3 mm/hole, a ratio of a nozzle hole length to a nozzle hole diameter (L/D) of 10, and a nozzle hole pitch of 0.75 mm. The resin melt was then discharged from the nozzle at a spinning temperature of 320° C. at a discharge rate of 0.13 g/min per hole, with injecting hot air having a temperature of 340° C. as accompanying jet at an air amount per meter of the nozzle width of 15 $Nm^3$/min. An ambient temperature 5 cm below the nozzle holes in the vertical direction (hereinafter, referred to as "temperature 5 cm below the nozzle") was 165.0° C.

As shown in FIG. 1, a heat-insulating cover having a length of 11.0 cm was provided below the nozzle to keep a space below the nozzle heated, and hot air having a temperature of 350° C. as heated air flow was blown in toward the nozzle holes from both sides of the nozzle through air blowing ports provided to side surfaces of the heat-insulating cover at an air amount per meter of the nozzle width of 2 $Nm^3$/min in order to heat the fiber materials discharged from the nozzle. A temperature of the fiber materials measured 10 cm below the spinning nozzle was 138.9° C.

Figure 3:
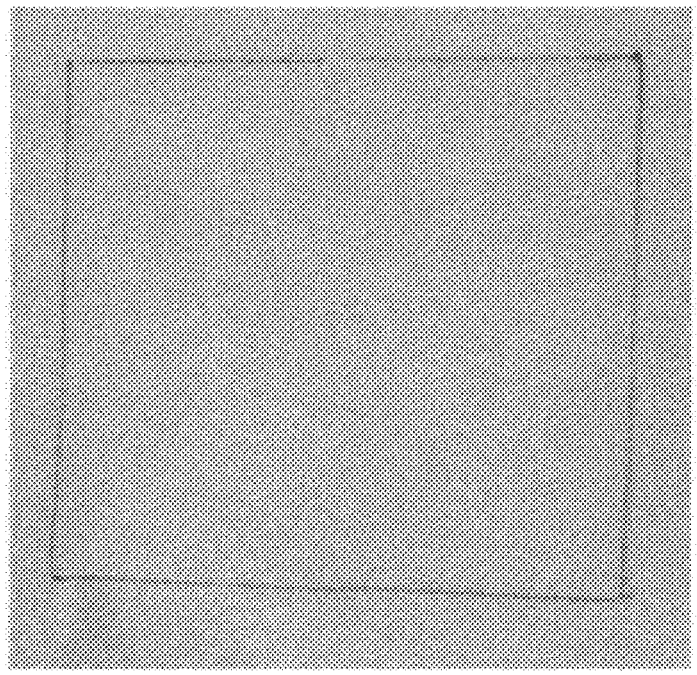
FIG. 3 is an image of an MB nonwoven fabric of Example 1 after heating test.

Then, the fiber materials from the heat-insulating cover were further allowed to travel through an air gap zone having a length of 9.0 cm and were collected on a collecting net to form a PET-series MB nonwoven fabric having a basis weight of 30 $g/cm^2$ without being subjected to a post-processing. As shown in FIG. 1, the heating zone H had a length of 11.0 cm, and the air gap zone L had a length of 9.0 cm. FIG. 3 shows the obtained MB nonwoven fabric after being subjected to heating at 200° C.

Example 2

Figure 4:
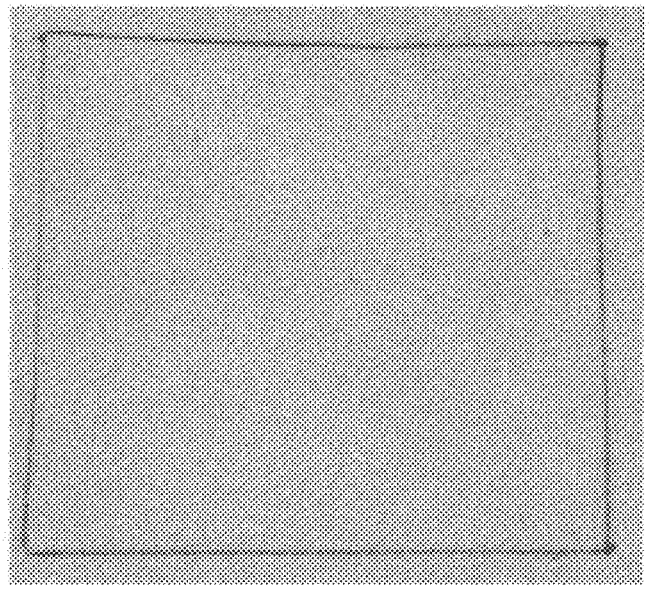
FIG. 4 is an image of an MB nonwoven fabric of Example 2 after heating test.

Example 2 was carried out in the same manner as that of Example 1, except that the heated air flow had a blowing temperature of 180° C. In this Example, the temperature 5 cm below the nozzle was 141.1° C., and the temperature of the fiber materials measured 10 cm below the spinning nozzle was 110.3° C. FIG. 4 shows the obtained MB nonwoven fabric after being subjected to heating at 200° C.

Example 3

Example 3 was carried out in the same manner as that of Example 1, except that the heat-insulating cover provided below the nozzle had a length of 15.0 cm, that the air gap zone had a length of 5.0 cm, and that the heated air flow had a blowing temperature of 300° C. In this Example, the temperature 5 cm below the nozzle was 142.0° C., and the temperature of the fiber materials measured 10 cm below the spinning nozzle was 130.7° C.

Example 4

Example 4 was carried out in the same manner as that of Example 1, except that the heat-insulating cover provided below the nozzle had a length of 15.0 cm and that the air gap zone had a length of 8.0 cm. In this Example, the temperature 5 cm below the nozzle was 145.2° C., and the temperature of the fiber materials measured 10 cm below the spinning nozzle was 137.6° C.

Example 5

Example 5 was carried out in the same manner as that of Example 1, except that the heat-insulating cover provided below the nozzle had a length of 17.5 cm, that the air gap zone had a length of 5.5 cm, and that the heated air flow had a blowing temperature of 180° C. In this Example, the temperature 5 cm below the nozzle was 138.9° C., and the temperature of the fiber materials measured 10 cm below the spinning nozzle was 123.6° C.

Comparative Example 1

Comparative Example 1 was carried out in the same manner as that of Example 1, except that blowing of the heated air flow through the air blowing ports was not carried out in the heat-insulating cover. That is, in Comparative Example 1, the distance H was 0 cm, and the distance L was 9.0 cm because the inside of the cover was not heated so that the space below the spinning nozzle was not heated to a temperature equal to or higher than the crystallization temperature of the PET-series resin. The temperature 5 cm below the nozzle was 119.1° C., and the temperature of the resin measured 10 cm below the spinning nozzle was 100.8° C.

Comparative Example 2

Figure 5:
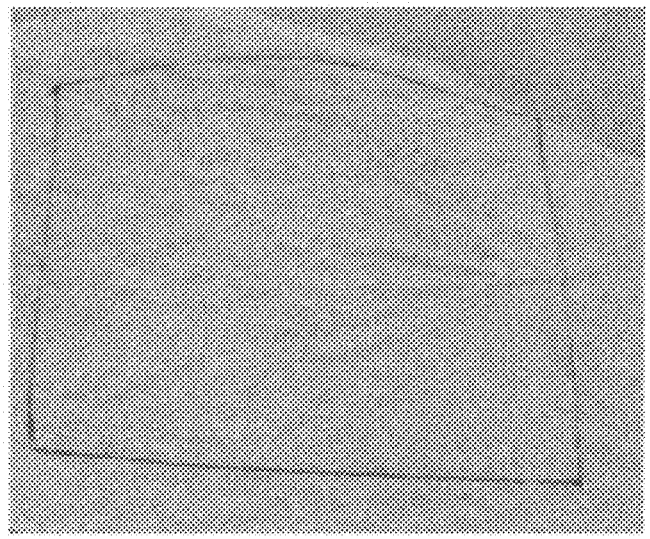
FIG. 5 is an image of an MB nonwoven fabric of Comparative Example 2 after heating test.

Comparative Example 2 was carried out in the same manner as that of Example 1, except that after the melt was discharged from the nozzle, the melt was directly collected on a collecting net provided 13 cm below the nozzle holes without providing the heat-insulating cover as well as blowing the heated air flow. That is, in Comparative Example 2, the distance H was 0 cm, and the distance L was 13.0 cm because the space below the spinning nozzle was not heated to a temperature equal to or higher than the crystallization temperature of the PET-series resin. The temperature 5 cm below the nozzle was 82.6° C., and the temperature of the resin measured 10 cm below the spinning nozzle was 54.6° C. FIG. 5 shows the obtained MB nonwoven fabric after being subjected to heating at 200° C.

Comparative Example 3

Comparative Example 3 was carried out in the same manner as that of Example 1, except that the heating zone H had a length of 10.5 cm and that the air gap zone L had a length of 2.0 cm. That is, in Comparative Example 3, the distance H was 10.5 cm, and the distance L was 2 cm. In this Comparative Example, the temperature 5 cm below the nozzle was 148.0° C., and the temperature of the fiber materials measured 10 cm below the spinning nozzle was 119.3° C.

TABLE 1

| | H (cm) | Temp. 5 cm below nozzle (° C.) | L (cm) | Temp. of fiber materials 10 cm below spinning nozzle (° C.) | Average fiber diameter (m) | Basis weight (g/m$^2$) | Thickness (mm) | Surface shrinkage ratio at 200° C. (%) | Molding processability at 200° C. |
|---|---|---|---|---|---|---|---|---|---|
| Ex. 1 | 11.0 | 165.0 | 9.0 | 138.9 | 3.6 | 29.4 | 0.265 | 7.3 | A |
| Ex. 2 | 11.0 | 141.1 | 9.0 | 110.3 | 3.1 | 29.1 | 0.227 | 15.9 | A |
| Ex. 3 | 15.0 | 142.0 | 5.0 | 130.7 | 3.8 | 29.7 | 0.232 | 9.5 | A |
| Ex. 4 | 15.0 | 145.2 | 8.0 | 137.6 | 3.6 | 30.3 | 0.241 | 11.8 | A |
| Ex. 5 | 17.5 | 138.9 | 5.5 | 123.6 | 3.9 | 29.2 | 0.228 | 10.0 | A |
| Com. Ex. 1* | 0 | 119.1 | 9.0 | 100.8 | 4.2 | 29.4 | 0.269 | 30.5 | B |
| Com. Ex. 2 | 0 | 82.6 | 13.0 | 54.6 | 3.2 | 31.4 | 0.229 | 33.4 | B |
| Com. Ex. 3 | 10.5 | 148.0 | 2.0 | 119.3 | 2.2 | 30.0 | 0.189 | 8.8 | B |

| | Tensile strength T (N/5 cm) | | | Elongation ratio E (%) | | | 10% modulus M (N/5 cm) | | | Air permeability |
|---|---|---|---|---|---|---|---|---|---|---|
| | MD | CD | MD/CD | MD | CD | MD/CD | MD | CD | MD/CD | (cm$^3$/cm$^2$ · s) |
| Ex. 1 | 22.7 | 19.3 | 1.18 | 32 | 28 | 1.14 | 20.1 | 15.5 | 1.30 | 45.0 |
| Ex. 2 | 21.2 | 18.4 | 1.15 | 45 | 47 | 0.96 | 17.0 | 14.7 | 1.16 | 70.2 |
| Ex. 3 | 21.1 | 17.5 | 1.21 | 32 | 39 | 0.82 | 17.3 | 14.5 | 1.19 | 55.3 |

TABLE 1-continued

| | | | | | | | | | | |
|---|---|---|---|---|---|---|---|---|---|---|
| Ex. 4 | 20.7 | 15.4 | 1.34 | 27 | 31 | 0.87 | 17.0 | 12.8 | 1.33 | 58.8 |
| Ex. 5 | 20.3 | 17.5 | 1.16 | 27 | 25 | 1.08 | 16.4 | 15.0 | 1.09 | 55.5 |
| Com. Ex. 1* | 15.8 | 13.1 | 1.21 | 36 | 27 | 1.33 | 14.3 | 12.0 | 1.19 | 63.5 |
| Com. Ex. 2 | 30.1 | 21.4 | 1.41 | 42 | 56 | 0.75 | 18.7 | 16.9 | 1.11 | 25.6 |
| Com. Ex. 3 | 40.1 | 26.7 | 1.50 | 36 | 46 | 0.78 | 31.5 | 19.6 | 1.61 | 23.4 |

*In Comparative Example 1, the distance H was treated to be 0 cm because the temperature of the heating zone was not sufficiently high to be considered as a heating zone.

As shown in Table 1, the temperature of the resin measured 10 cm below the spinning nozzle in Comparative Example 1 was lower than those in the Examples because Comparative Example 1 did not perform heating in the heat-insulating cover. Further, presumably because crystallization was not promoted due to absence of the heating zone, the obtained sample had a surface shrinkage ratio at 200° C. exceeding 30%. Also, when compared with those of the Examples, the MB nonwoven fabric of Comparative Example 1 had lower strength. The laminate including the support and the MB nonwoven fabric that were thermocompression-bonded to each other had winkles in appearance because the MB nonwoven fabric was greatly shrunk due to heating, thus indicating insufficient molding processability.

In Comparative Example 2, the temperature of the resin measured 10 cm below the spinning nozzle only reached a temperature half as high as those of Examples because the heat-insulating cover was not provided. Therefore, the obtained sample has a surface shrinkage ratio at 200° C. exceeding 30%. Also in the laminate of the support and the MB nonwoven fabric that were thermocompression-bonded to each other, winkles appeared because the MB nonwoven fabric was greatly shrunk due to heating, thus indicating insufficient molding processability.

In Comparative Example 3, although the heating zone was provided, the fiber materials from the heating zone could not be loosened to be bulky because of too short distance L, i.e., the length of the air gap zone, of 2.0 cm. Thus, the resultant nonwoven fabric had a value of the longitudinal 10% modulus exceeding 30 N/5 cm in the longitudinal direction (MD direction) and a hard texture. The obtained nonwoven fabric had an air permeability half as high as those of Examples. Also, the laminate including the support and the MB nonwoven fabric that were thermocompression-bonded to each other was firm to the touch. Further, the nonwoven fabric did not have soft texture, resulting in insufficient molding processability.

In contrast, all the samples obtained in Examples 1 to 5 had suppressed surface shrinkage ratios at 200° C. as well as values of the 10% modulus approximately equal to or lower than 20 N/5 cm in the longitudinal direction (MD direction), making it possible to obtain nonwoven fabrics having soft texture. These nonwoven fabrics had higher strengths than that of Comparative Example 1. Further, the obtained nonwoven fabrics were highly isotropic in strength and elongation in the longitudinal and the transverse directions, allowing the nonwoven fabrics to be well-balanced in the longitudinal and the transverse directions.

In comparison with Comparative Examples 2 and 3, all of Examples 1 to 5 could enhance air permeability.

Furthermore, each of the laminates of the supports and the MB nonwoven fabrics obtained from the Examples 1 to 5 which were thermocompression-bonded to each other had no winkles in appearance after heating and thus was excellent in molding processability.

TABLE 2

| | Peeling Strength of Laminate (N/5 cm) |
|---|---|
| Ex. 1 | 0.68 |
| Ex. 2 | 0.34 |
| Ex. 3 | 0.82 |
| Ex. 4 | 0.53 |
| Ex. 5 | 0.80 |

Table 2 shows peeling strengths of the laminates each including the support and the MB nonwoven fabric obtained in Examples 1 to 5 which are thermocompression-bonded to each other. As shown in Table 2, all the laminates having the MB nonwoven fabrics obtained from Examples 1 to 5 had peeling strength higher than 0.3 N/5 cm.

INDUSTRIAL APPLICABILITY

As discussed above, MB nonwoven fabrics and laminates using the same according to the present invention can suitably be applied to various applications, such as medical and hygienic materials, industrial materials, daily commodities and clothing. In particular, the MB nonwoven fabrics and the laminates can suitably be applied to acoustic materials for vehicles (in particular, acoustic materials for automobiles), high-frequency acoustic panels for outdoor use, and noise suppression sheets for electronic devices because of their excellent high-frequency acoustic properties.

Although the present invention has been described in connection with the preferred embodiments thereof, various additions, modifications, or deletions may be made without departing from the scope of the invention. Accordingly, such variants are included within the scope of the present invention.

REFERENCE NUMERALS

100 . . . melt blowing apparatus
10 . . . die
12 . . . nozzle hole
14 . . . hot-air injection channel
20 . . . hollow cover
22 . . . air blowing port
24 . . . heated air flow
26 . . . heating zone
28 . . . lower edge of the heating zone (lower edge of the hollow cover)
30 . . . air gap zone
40 . . . extruder
50 . . . fiber materials
60 . . . collector
62 . . . collecting surface

What is claimed is:

1. A melt blown nonwoven fabric comprising a resin composition including a polyethylene terephthalate-series resin as a principal component, wherein
the melt blown nonwoven fabric has a surface shrinkage ratio at 200° C. of 20% or lower, a longitudinal 10% modulus ($M_{MD}$) at 30° C. of 22 N/5 cm or lower, and a longitudinal tensile strength ($T_{MD}$) of 20.3 N/5 cm or higher.

2. The melt blown nonwoven fabric according to claim 1, wherein the melt blown nonwoven fabric has a ratio ($T_{MD}/T_{CD}$) of the longitudinal tensile strength ($T_{MD}$) to a transverse tensile strength ($T_{CD}$) in a range from 1.00 to 1.40.

3. The melt blown nonwoven fabric according to claim 1, wherein the melt blown nonwoven fabric has a longitudinal elongation ratio ($E_{MD}$) of 25% or higher and a ratio ($E_{MD}/E_{CD}$) of the longitudinal elongation ratio ($E_{MD}$) to a transverse elongation ratio ($E_{CD}$) in a range from 0.80 to 1.20.

4. The melt blown nonwoven fabric according to claim 1, wherein the melt blown nonwoven fabric has an air permeability of from 30 to 90 cm$^3$/cm$^2$·s in accordance with JIS L 1906.

5. An acoustic material for a vehicle, comprising the melt blown nonwoven fabric according to claim 1.

6. A laminate comprising a support and a melt blown nonwoven fabric that is thermocompression-bonded to at least one surface of the support, wherein the melt blown nonwoven fabric is a melt blown nonwoven fabric according to claim 1.

7. The laminate according to claim 6, wherein the laminate has a peeling strength (T-peel test) of 0.2 N/5 cm or higher in accordance with JIS K 6854-3 at a thermocompression-bonded surface between the melt blown nonwoven fabric and the support.

8. The laminate according to claim 6, wherein the support is a nonwoven fabric or a felt.

9. An acoustic material for a vehicle, comprising a laminate according to claim 6.

10. A method of producing the melt blown nonwoven fabric of claim 1, the method comprising:
heating a resin composition comprising a polyethylene terephthalate-series resin to give a melt and discharging the melt with accompanying jet through nozzle holes to give fiber materials;
heating the fiber materials discharged through the nozzle holes in a heating zone;
exposing the heated fiber materials to outside air in an air gap zone to cool the fiber materials; and
collecting the cooled fiber materials on a collecting surface to obtain a web,
wherein at least a part of the heating zone is heated to a crystallization temperature of the polyethylene terephthalate-series resin or higher; and
the air gap zone is a space between a lower edge of the heating zone and the collecting surface, the space having a distance L of 5 cm or longer in a line extending downwardly from the nozzle holes in a vertical direction.

11. The method of producing a melt blown nonwoven fabric according to claim 10, wherein the heating zone is a space between the nozzle holes and the lower edge of the heating zone, the space having a distance H of 10 cm or longer in the line extending downwardly from the nozzle holes in the vertical direction.

12. The method of producing a melt blown nonwoven fabric according to claim 10, wherein the fiber materials have a temperature equal to or higher than the crystallization temperature (Tc)−25° C., at a position 10 cm below the nozzle holes in the vertical direction in the heating zone.

13. The method of producing a melt blown nonwoven fabric recited in claim 10, wherein the crystalline thermoplastic resin is a polyethylene terephthalate-series resin.

14. A melt blowing apparatus to conduct the method of claim 10, comprising:
an extruder configured to heat a resin composition including a polyethylene terephthalate-series resin to give a melt;
a die configured to discharge the melt with an accompanying jet to give fiber materials;
a hollow cover provided in a downstream side of the accompanying jet and configured to surround the fiber materials;
a heating unit configured to heat the fiber materials;
a collector having a collecting surface configured to collect the fiber materials flowing from the hollow cover in a downward direction of the accompanying jet,
wherein the hollow cover and the collector are separated by a distance of 5 cm or longer between a lower edge of the hollow cover and the collecting surface in a line extending downwardly from the nozzle holes in a vertical direction.

15. The melt blowing apparatus according to claim 14, wherein the nozzle holes and the lower edge of the hollow cover are separated by a distance of 10 cm or longer in the line extending downwardly from the nozzle holes in the vertical direction.

16. The melt blowing apparatus according to claim 14, wherein the hollow cover is formed with an air blowing port configured to introduce heated air.

* * * * *